United States Patent [19]

Cooper et al.

[11] 3,925,368
[45] Dec. 9, 1975

[54] ACYLUREIDO SUBSTITUTED CEPHALOSPORINS

[75] Inventors: Robin D. G. Cooper; David K. Herron, both of Indianapolis, Ind.

[73] Assignee: Eli Lilly and Company, Indianapolis, Ind.

[22] Filed: Apr. 1, 1974

[21] Appl. No.: 456,517

[52] U.S. Cl. ....... 260/240 J; 260/243 C; 260/544 C; 424/246
[51] Int. Cl.² ........................................ C07D 501/36
[58] Field of Search ..................... 260/243 C, 240 J

[56] References Cited
UNITED STATES PATENTS

| | | | |
|---|---|---|---|
| 3,641,021 | 2/1972 | Ryan | 260/243 C |
| 3,687,949 | 8/1972 | Holdrege | 260/243 C |
| 3,741,962 | 6/1973 | Breuer | 260/243 C |
| 3,766,175 | 10/1973 | Lemieux et al. | 260/243 C |
| 3,772,286 | 11/1973 | Hoover et al. | 260/243 C |

*Primary Examiner*—Richard J. Gallagher
*Assistant Examiner*—Anne Marie T. Tighe
*Attorney, Agent, or Firm*—William B. Scanlon; Everet F. Smith

[57] ABSTRACT

Cephalosporin compounds having an acylated ureido group substituted in the α-position of the 7-arylacetamido side chain, and wherein the 3-position of the 3-cephem ring is substituted with a tetrazolethiomethyl, or a 1,3,4-thiadiazolethiomethyl group, are valuable therapeutic agents having an expanded spectrum of activity. For example, 7-[α-(3-o-chlorobenzoyl-3-methyl-1-ureido)-α-phenylacetamido]-3-(1-methyl-1H-tetrazole-5-ylthiomethyl)-3-cephem-4-carboxylic acid is an especially valuable antibiotic compound.

5 Claims, No Drawings

ACYLUREIDO SUBSTITUTED CEPHALOSPORINS

BACKGROUND OF THE INVENTION

This invention relates to cephalosporin antibiotic compounds. In particular, it relates to 7-arylacetamido cephalosporin antibiotics having in the α-position of the acetamido side chain an acylureido function, and in the 3-position a lower alkyl substituted tetrazole thiomethyl group or a lower alkyl substituted 1,3,4-thiadiazole thiomethyl group. The aryl portion of the arylacetamido side chain can be phenyl, substituted phenyl, thienyl, or furyl and the acyl group of the acylureido α-substituent can be lower alkanoyl, for example, acetyl, benzoyl or cinnamoyl, wherein the phenyl ring is preferably substituted with chlorine.

The antibiotics described herein are useful in inhibiting the growth of a wide spectrum of pathogenic microorganisms. The cephalosporin antibiotics described herein can be used in combatting infections caused by both the gram-negative and gram-positive type microorganisms.

The cephalosporin compounds are prepared synthetically by acylating the α-amino group of an arylglycylamido cephalosporin having either the tetrazole thiomethyl or the thiadiazole thiomethyl substituent in the 3-position, with an N-lower alkanoyl-N-methyl carbamoyl chloride, with an N-benzoyl (or cinnamoyl)-N-methyl carbamoyl chloride or with a halogen or nitro derivative thereof. The free acids of the foregoing compounds can be converted to the corresponding indanyl, phthalidyl esters or the acyloxymethyl esters by reaction of an alkali metal salt, for example, the sodium or potassium salt, with a halomethyl alkanoate such as chloromethyl acetate or with a halomethyl benzoate, for example, bromomethyl benzoate. The acyloxy methyl esters of the cephalosporins are useful oral forms of the antibiotic. The free acid form of the cephalosporin antibiotics are useful when administered parenterally.

DESCRIPTION OF THE PRIOR ART

In U.S. Pat. No. 3,673,183 issued June 27, 1972, and British Pat. No. 1,337,000, cephalosporin compounds having a ureido substituent in the α-position of the 7-acylamido side chain are described. Penicillins and cephalosporins each having an α-(3-imidoylureido)arylacetamido side chain are described in U.S. Pat. Nos. 3,634,405 and 3,646,024, respectively. In Belgian Pat. No. 767,647, α-3-acylureidobenzyl penicillins are disclosed.

Acyloxymethyl esters of α-ureido cyclohexadienyl acetamido cephalosporins are known and are described in U.S. Pat. No. 3,708,479. The acyloxymethyl esters of α-aminobenzyl penicillin are also known and are described in U.S. Pat. No. 3,697,507.

The compounds provided by this invention differ structurally from the compounds of the prior art in that the cephalosporin dihydrothiazine ring is substituted in the 3-position with one of the above-described heterocyclic-thiomethyl groups. In addition, the cephalosporin antibiotics described herein can be characterized as expanded spectrum cephalosporin antibiotics in that they not only possess the usual high level of activity against gram-positive microorganisms but they also possess a high level of activity against a broad spectrum of gram-negative microorganisms.

DETAILED DESCRIPTION

The acylureido cephalosporin antibiotics of this invention are represented by the following formula.

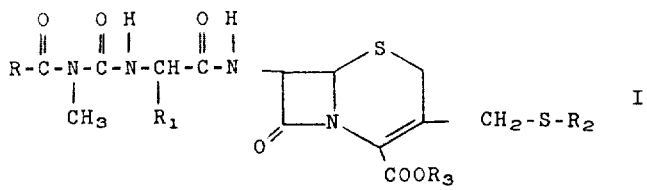

wherein R is $C_1$–$C_4$ lower alkyl, or a group of the formula

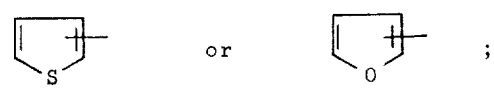

wherein $a$ and $a'$ independently are hydrogen, halogen or nitro, and $n$ is 0 or 1;

$R_1$ is phenyl, hydroxyphenyl, halophenyl, hydroxy substituted halophenyl, $R_2$ is 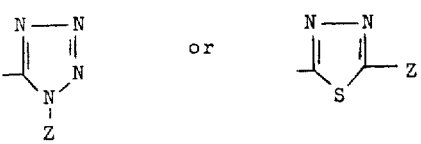

wherein
Z is $C_1$–$C_4$ lower alkyl;
$R_3$ is hydrogen, indanyl, phthalidyl, or an acyloxymethyl group of the formula

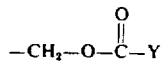

wherein
Y is $C_1$–$C_4$ alkyl or phenyl; and when
$R_3$ is hydrogen, the pharmaceutically acceptable, nontoxic salts thereof.

In the foregoing definition, when R is a "$C_1$–$C_4$ lower alkyl group" R can be methyl, ethyl, n-propyl, or iso-propyl. When R is representative of a group of the formula

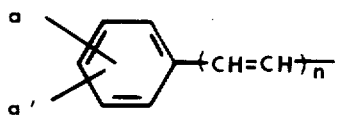

and n is 0 representative of the groups

are the following: benzoyl, 2-chlorobenzoyl, 3-chlorobenzoyl, 4-chlorobenzoyl, 3,4-dichlorobenzoyl, 4-bromobenzoyl, 4-fluorobenzoyl, 3-nitrobenzoyl and 4-nitrobenzoyl; and when n is 1, representative groups include, for example, cinnamoyl, 2-chlorocinnamoyl, 4-chlorocinnamoyl, 3-bromocinnamoyl, 3,4-dichlorocinnamoyl, 4-fluorocinnamoyl, 3-nitrocinnamoyl and 4-nitrocinnamoyl.

When in the foregoing formula $R_1$ is a halophenyl, hydroxyphenyl or hydroxy substituted halophenyl group, $R_1$ can be 4-hydroxyphenyl, 3-hydroxyphenyl, 4-chlorophenyl, 3-chlorophenyl, 3,4-dichlorophenyl, 3,5-dichloro-4-hydroxyphenyl and 3-chloro-4-hydroxyphenyl.

As used herein, the term "halogen" refers to fluoro, chloro, and bromo. The preferred halogen is chloro.

As used within the definition of Z in the above formula, the term, "$C_1$–$C_4$ lower alkyl", refers to the lower alkyl hydrocarbon radical such as methyl, ethyl, n-propyl, iso-propyl, n-butyl, and t-butyl.

As previously mentioned, the cephalosporin compounds of this invention are prepared by reacting a phenylglycylamido, a thienylglycylamido, or a furylglycylamido cephalosporin compound having in the 3-position a tetrazolethiomethyl or a thiadiazolethiomethyl substituent with an N-acyl-N-methylcarbamoyl chloride represented by the formula

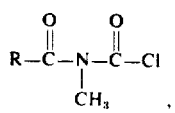

wherein R has the same meanings as defined above.

The reaction is illustrated by the following reaction scheme.

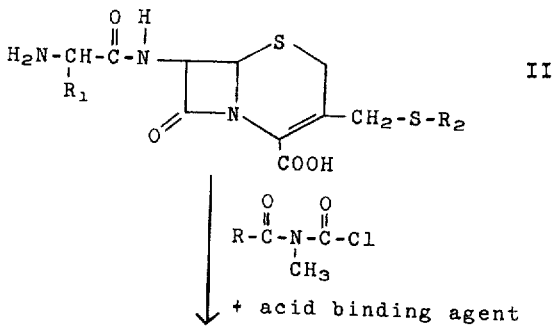

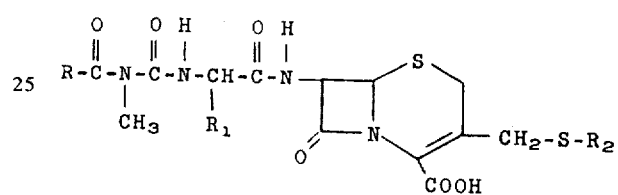

The starting materials used in the preparation of the acylureido-cephalosporins of the formula I have been previously described. Ryan in U.S. Pat. No. 3,641,021 describes the preparation of the 7-arylglycylamidocephalosporins of the formula II wherein $R_1$ is phenyl, substituted phenyl and thienyl and wherein $R_2$ is the 1-H-tetrazole group or 1,3,4-thiadiazole group. The compounds of the formula II wherein $R_1$ is furyl are prepared in the same manner by acylating a 7-amino-3-heterocyclic-thiomethyl-3-cephem-4-carboxylic acid with an amino-protected furylglycine of the formula

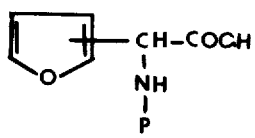

wherein P can be a urethane type protecting group such as the t-butyloxycarbonyl group, or other amino-protecting group. The furylglycine is converted to an active derivative for example, a mixed anhydride, or the derivative formed with ethyl chloroformate, to provide a reactive derivative for acylation of the 7-amino nucleus compound.

The N-acyl-N-methylcarbamoyl chlorides employed in this invention are prepared by first reacting an N-methyl-$C_1$-$C_4$ lower alkyl amide, an N-methylbenzamide or an N-methylcinnamide with n-butyllithium at about $-78°$ C. to generate the lithium salt of the amide and then by reacting the lithium salt in the cold with phosgene in an inert atmosphere to obtain the N-acyl- N-methylcarbamoyl chloride.

The acylation reaction depicted above is carried out by reacting the 7-arylglycylamido-3-(1-substituted-1H-tetrazole-5-ylthiomethyl or 5-substituted 1,3,4-thiadiazole-2-ylthiomethyl)-3-cephem-4-carboxylic acid in an inert solvent with at least an equimolar amount of the N-acyl-N-methylcarbamoyl chloride at a temperature between about −5 and 25° C. and preferably at 0°-5° C.

The acylation is carried out in the presence of an acid binding agent, for example, a tertiary amine such as triethylamine or pyridine or preferably an alkylene oxide such as propylene oxide or butylene oxide.

Solvents such as tetrahydrofuran, dioxane and acetonitrile can be used in the acylation reaction.

In general, the preparation of the acylureido cephalosporin compounds of the formula I occurs in high yields and the product antibiotics are easy to isolate by conventional extraction procedures.

Illustrative of the N-acyl-N-methylcarbamoyl chlorides used in the synthesis of the antibiotics of formula I include N-(2-chlorobenzoyl)-N-methylcarbamoyl chloride, N-(3-nitrobenzoyl)-N-methylcarbamoyl chloride, N-(4-bromobenzoyl)-N-methylcarbamoyl chloride, N-benzoyl-N-methylcarbamoyl chloride, N-(3,4-dichlorobenzoyl)-N-methylcarbamoyl chloride, N-cinnamoyl-N-methylcarbamoyl chloride, N-(2-chlorocinnamoyl)-N-methylcarbamoyl chloride, N-(3-nitrocinnamoyl)-N-methylcarbamoyl chloride, N-(2,4-dichlorocinnamoyl)-N-methylcarbamoyl chloride, N-acetyl-N-methylcarbamoyl chloride, N-propionyl-N-methylcarbamoyl chloride, and N-butyryl-N-methylcarbamoyl chloride.

The 7-arylglycylamido-3-tetrazolethiomethyl or 1,3,4-thiadiazolethiomethyl-3-cephem-4-carboxylic acids of the formula II are illustrated below wherein the $R_1$ and $R_2$ groups refer to formula II.

| $R_1$ | $R_2$ |
|---|---|
| phenyl | 1-methyl-1H-tetrazole-5-yl |
| 4-hydroxyphenyl | 1-methyl-1H-tetrazole-5-yl |
| 4-chlorophenyl | 1-methyl-1H-tetrazole-5-yl |
| 4-chlorophenyl | 1-ethyl-1H-tetrazole-5-yl |
| 3-chloro-4-hydroxyphenyl | 5-methyl-1,3,4-thiadiazole-2-yl |
| 4-hydroxyphenyl | 5-methyl-1,3,4-thiadiazole-2-yl |
| 3-hydroxyphenyl | 5-methyl-1,3,4-thiadiazole-2-yl |
| phenyl | 5-n-propyl-1,3,4-thiadiazole-2-yl- |
| 3,5-dichloro-4-hydroxyphenyl | 1-methyl-1H-tetrazole-5-yl- |
| 2-thienyl | 1-methyl-1H-tetrazole-5-yl- |
| 2-furyl | 1-methyl-1H-tetrazole-5-yl- |
| 3-thienyl | 5-methyl-1,3,4-thiadiazole-2-yl- |
| 3,5-dichloro-4-hydroxyphenyl | 5-methyl-1,3,4-thiadiazole-2-yl- |
| 3-bromophenyl | 5-methyl-1,3,4-thiadiazole-2-yl- |
| 4-fluorophenyl | 5-methyl-1,3,4-thiadiazole-2-yl- |

As a specific example of the process for preparing the compounds of the invention 7-(D-phenylglycylamido)-3-(1-methyl-1H-tetrazole-5-ylthiomethyl)-3-cephem-4-carboxylic acid is suspended in acetonitrile containing excess propylene oxide as the acid binding agent. The starting material is solubilized as a silylated derivative by adding a silylating agent such as bis(trimethylsilyl)acetamide to the suspension. The solution is cooled to between 0° and 5° C. and a solution of at least an equimolar amount of N-(2-chlorobenzoyl)-N-methylcarbamoyl chloride in acetonitrile is added. After stirring in the cold for between 2 and 4 hours the reaction mixture is allowed to warm to room temperature. The reaction mixture is evaporated to dryness under reduced pressure and the product, 7-[α-(3-o-chlorobenzoyl-3-methyl-1-ureido)-α-phenylacetamido]-3-(1-methyl-1H-tetrazole-5-ylthiomethyl)-3-cephem-4-carboxylic acid, is extracted from the residue with ethyl acetate.

The N-acylureido cephalosporins of this invention as represented by the structural formula I wherein $R_3$ is hydrogen are illustrated by the following exemplary compounds.

7-[α-(3-acetyl-3-methyl-1-ureido)-α-phenylacetamido]-3-(1-methyl-1H-tetrazole-5-ylthiomethyl)-3-cephem-4-carboxylic acid, 7-[α-(3-benzoyl-3-methyl-1-ureido)-α-(4-hydroxyphenyl) acetamido]-3-(1-methyl-1H-tetrazole-5-ylthiomethyl)-3-cephem-4-carboxylic acid, 7-[α-(3-(2-chlorobenzoyl)-3-methyl-1-ureido)-α-(4-chlorophenyl)acetamido]-3-(5-methyl-1,3,4-thiadiazole-2-ylthiomethyl) 3-cephem-4-carboxylic acid, 7-[α-(3-cinnamoyl-3-methyl-1-ureido)-α-(3-chloro-4-hydroxyphenyl)acetamido]-3-(1-methyl-1H-tetrazole-5-ylthiomethyl)-3-cephem-4-carboxylic acid, 7-[α-(3-(3-nitrocinnamoyl)-3-methyl-1-ureido)-60-(3-hydroxyphenyl)acetamido]-3-(5-methyl-1,3,4-thiadiazole-2-ylthiomethyl)-3-cephem-4-carboxylic acid, 7-[α-(3-(2-thienyl)-3-methyl-1-ureido)-α-phenylacetamido]-3-(1-methyl-1H-tetrazole-5-ylthiomethyl)-3-cephem-4-carboxylic acid, 7-[α-(3-(2,4-dichlorobenzoyl)-3-methyl-1-ureido)-α-(4-chlorophenyl)acetamido]-3-(1-methyl-1H-tetrazole-5-ylthiomethyl)-3-cephem-4-carboxylic acid, 7-[α-(3-(2-furoyl)-3-methyl-1-ureido)-α-(4-hydroxyphenyl) acetamido]-3-(5-ethyl-1,3,4-thiadiazole-2-ylthiomethyl)-3-cephem-4-carboxylic acid, 7-[α-(3-(2-chlorobenzoyl)-3-methyl-1-ureido)-α-(3,5-dichloro 4-hydroxyphenyl)acetamido]-3-(1-methyl-1H-tetrazole-5-ylthiomethyl)-3-cephem-4-carboxylic acid.

The antibiotics of the formula I wherein $R_3$ is hydrogen, for example the above exemplary compounds, can be converted to pharmaceutically acceptable salts with inorganic bases and amines. The sodium and potassium salts of the antibiotics can be prepared with sodium and potassium carbonate. Lithium carbonate forms the lithium salt when reacted with the acid form of the antibiotic. Salts formed with non-toxic, pharmaceutically acceptable amines are, for example, the dimethylammonium salt formed with dimethylamine, the dicyclohexylamine salt formed with dicyclohexylamine, the diethanolamine salt formed with diethanolamine, the salt formed with tris-(hydroxymethyl) aminomethane (tris-buffer) and like amine salts.

The compounds of the formula I wherein $R_3$ is an indanyl group of the formula

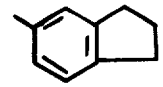

the indanyl esters, are prepared by reacting 5-indanol in an inert solvent such as dioxane or tetrahydrofuran with the free acid form of the N-acylureido cephalosporin of the formula I, wherein $R_3$ is hydrogen, in the presence of a condensing agent such as a diimide, for example, dicyclohexylcarbodiimide. The reaction is carried out at about 20°–35° C. for about 6 to 8 hours. The indanyl ester is recovered by first diluting the reaction mixture with water and filtering to remove the insoluble dicyclohexylurea side product. The ester is then extracted from the filtrate.

The phthalidyl ester of the formula I wherein $R_3$ is a phthalidyl group of the formula

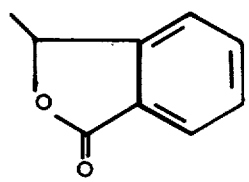

are obtained by reacting bromophthalide of the formula

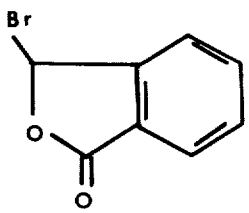

with a salt of a cephalosporin acid of the formula I. The esterification can be carried out in dimethylformamide, dimethylacetamide, tetrahydrofuran or dioxane by heating a mixture of equimolar amounts of the cephalosporin salt with bromophthalide. The sodium or potassium salt of the cephalosporin acid can be used in the reaction.

The cephalosporin antibiotics of the formula I wherein $R_3$ is hydrogen are converted to the acyloxymethyl esters, wherein $R_3$ is represented by the group

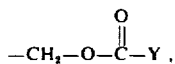

by reacting an alkali metal salt of the cephalosporin carboxylic acid, for example, the lithium, sodium, or potassium salt, with an acyloxymethyl halide of the formula

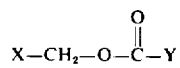

wherein X is chloro or bromo and Y has the same meanings as previously defined. Acyloxymethyl halides which can be employed include chloromethyl acetate, bromomethyl acetate, bromomethyl propionate, chloromethyl pivaloate, and benzoyloxymethyl chloride.

The acylureido cephalosporin antibiotics of this invention (formula I, $R_3 = H$) are effective in inhibiting the growth of a wide variety of pathogenic microorganisms of the gram-positive and gram-negative types. Prior to this invention cephalosporin antibiotics were known to be highly effective against gram-positive microorganisms with a limited gram-negative spectrum. Extensive efforts have been made to prepare cephalosporin antibiotics with a broader gram-negative spectrum of activity. While this has been achieved with certain cephalosporins it has been found that these compounds have lost, to a significant degree, the outstanding gram-positive activity.

The antibiotics provided herein can be characterized as expanded spectrum cephalosporin antibiotics in that they possess excellent activity against a broad spectrum of gram-negative microorganisms while yet retaining the high levels of activity against the gram-positive microorganisms. For example, the compounds of the formula I, inhibit the growth of Enterobacter, indole-positive and indole-negative Proteus, Aerobacter, Pseudomonas, Klebsiella, Serratia, the Streptococcus D group, Staphylococcus and penicillin resistant strains of Staphylococcus.

The cephalosporin antibiotics of the formula I wherein $R_3$ is hydrogen are useful in combatting infections attributable to the gram-negative and gram-positive microorganisms. The antibiotics and the pharmaceutically acceptable salts can be administered parenterally, for example, intravenously or intramuscularly in the treatment of the infected host.

The cephalosporin esters of the formula I wherein $R_3$ is indanyl, phthalidyl or an acyloxymethyl group, for example, the acetoxymethyl ester, are effective antibiotics when administered orally.

The activity of the acylureido cephalosporins is illustrated by the in vitro test data obtained with representative compounds against several gram-negative bacteria and Staphylococcus. The data were obtained in the standard gradient-plate method and are reported as minimum inhibitory concentrations of the test compounds in micrograms for milliliter (mcg./ml.).

TABLE I

Antibiotic Activity of N-acylureidocephalosporins[Minimum Inhibitory Concentration (mcg/ml)]

| Test Organism[1] | Test Compound No.[2] | | | | | | | | |
|---|---|---|---|---|---|---|---|---|---|
| | 1 | 2 | 3 | 4 | 5 | 6 | 7 | 8 | 9 |
| Shigella sp. | 0.6 | 1.0 | 2.0 | 4.0 | 2.0 | 6.0 | 4.0 | 14 | 4.0 |
| Escherichia coli | 5.0 | 4.0 | 3.5 | 5.8 | 3.5 | 7.0 | 6.3 | 22 | 6.5 |
| Klebsiella pneumoniae | 0.6 | 0.6 | 0.2 | 0.7 | 1.0 | 0.7 | 0.6 | 5.5 | 1.0 |
| Aerobacter aerogenes | 3.0 | 6.8 | 3.5 | 6.8 | 4.0 | 6.8 | 7.0 | 38 | 5.5 |
| Salmonella heidelberg | 0.6 | 3.5 | 4.0 | 5.0 | 1.0 | 5.5 | 5.0 | 36 | 1.0 |
| Pseudomonas aeruginosa | 20 | 40 | 22 | 17 | 30 | 72.5 | 30 | 45 | 45 |
| Serratia marcescens | 1.0 | 5.5 | 5.5 | 5.0 | 6.5 | 16 | 12 | 110 | 40 |
| V-41 | 3.0 | 5.0 | 4.0 | 0.9 | 3.0 | 6.5 | 4.0 | 6.3 | 1.0 |
| V-32 | 4.0 | 5.0 | 4.5 | 0.9 | 4.0 | 6.5 | 4.0 | 6.3 | 4.5 |
| V-84 | 0.5 | 0.9 | 0.5 | 0.4 | 0.5 | 0.8 | 0.6 | 0.4 | 0.5 |

[1]Organisms V-41, V-32 and V-84 are penicillin resistant Staphylococcus strains.
[2]Compound Nos. 1 through 9 refer to the compounds of the formula I wherein $R_3$ is H as follows:

TABLE I-continued

Antibiotic Activity of N-acylureidocephalosporins[Minimum Inhibitory Concentration (mcg/ml)]

| Test Organism[1] | Test Compound No.[2] | | | | | | | | |
|---|---|---|---|---|---|---|---|---|---|
| | 1 | 2 | 3 | 4 | 5 | 6 | 7 | 8 | 9 |

| No. | R-C(O) | $R_1$ | $R_2$ |
|---|---|---|---|
| 1 | cinnamoyl | phenyl | 1-methyl-1H-tetrazole-5-yl |
| 2 | cinnamoyl | 4-hydroxyphenyl | 1-methyl-1H-tetrazole-5-yl |
| 3 | cinnamoyl | 4-hydroxyphenyl | 5-methyl-1,3,4-thiadiazole-2-yl |
| 4 | 2-chlorobenzoyl | phenyl | 1-methyl-1H-tetrazole-5-yl |
| 5 | 4-chlorobenzoyl | phenyl | 1-methyl-1H-tetrazole-5-yl |
| 6 | 4-chlorobenzoyl | 4-hydroxyphenyl | 1-methyl-1H-tetrazole-5-yl |
| 7 | 4-chlorobenzoyl | 4-hydroxyphenyl | 5-methyl-1,3,4-thiadiazole-2-yl |
| 8 | benzoyl | phenyl | 1-methyl-1H-tetrazole-5-yl |
| 9 | acetyl | phenyl | 1-methyl-1H-tetrazole-5-yl |

A preferred group of N-acylureido cephalosporin compounds are represented by the formula I wherein $R_1$ is phenyl, hydroxyphenyl or hydroxy substituted halophenyl or thienyl; $R_2$ is

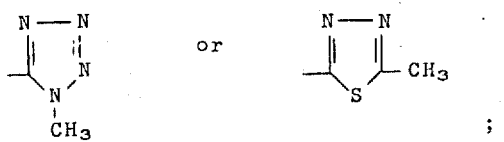

$R_3$ is hydrogen and the pharmaceutically acceptable salts thereof.

An especially preferred group of antibiotics are represented by the formula I wherein R is

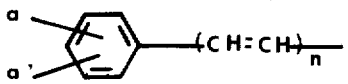

$R_1$ is phenyl, hydroxyphenyl or hydroxy substituted halophenyl, $R_2$ is the 1-methyl-1H-tetrazole-5-yl group or the 5-methyl-1,3,4-thiadiazole-2-yl group and $R_3$ is hydrogen and the pharmaceutically acceptable non-toxic salts thereof.

Representative of the latter preferred group are

7-[α-(3-o-chlorobenzoyl-3-methyl-1-ureido)-α-(4-hydroxyphenyl)acetamido]-3-(1-methyl-1H-tetrazole-5-ylthiomethyl)-3-cephem-4-carboxylic acid, 7-[α-(3-p-chlorobenzoyl-3-methyl-1-ureido)-α-(3-chloro-4-hydroxyphenyl)acetamido]-3-(5-methyl-1,3,4-thiadiazole-2-ylthiomethyl)-3-cephem-4-carboxylic acid, 7-[α-(3-o-chlorocinnamoyl-3-methyl-1-ureido)-α-(3-hydroxyphenyl)acetamido]-3-(1-methyl-1H-tetrazole-5-ylthiomethyl)-3-cephem-4-carboxylic acid, 7-[α-(3-m-nitrocinnamoyl-3-methyl-1-ureido)-α-phenylacetamido]-3-(5-methyl-1,3,4-thiadiazole-2-ylthiomethyl)-3-cephem-4-carboxylic acid, 7-α-(3-o-chlorobenzoyl-3-methyl-1-ureido)-α-(3,5-dichloro-4-hydroxyphenyl)acetamido]-3-(5-methyl-1,3,4-thiadiazole-2-ylthiomethyl)-3-cephem-4-carboxylic acid and the pharmaceutically acceptable non-toxic salts thereof.

The following examples are provided to further illustrate the present invention and are not intended to be limiting thereof.

EXAMPLE 1

Preparation of N-Acyl-N-methylcarbamoyl chlorides

The following experimental procedure employed for the preparation of N-(o-chlorobenzoyl)-N-methylcarbamoyl chloride was followed in preparing the various carbamoyl chlorides used in the remainder of the examples.

To a solution of 17.5 g. of o-chlorobenzoyl chloride in 100 ml. of dry tetrahydrofuran maintained at 0° C. under an atmosphere of nitrogen was added dropwise with stirring 16 ml. of 40% methylamine in water. The reaction mixture was stirred for 0.5 hours while warming to room temperature. The reaction mixture was evaporated to dryness under reduced pressure and the crude reaction product residue was dissolved in a mixture of ethyl acetate and water. The organic phase was separated and was washed consecutively with 0.5 N hydrochloric acid, 0.6 M sodium bicarbonate and with brine. The washed ethyl acetate solution was dried over sodium sulfate and evaporated to dryness to provide 13.3 g. of N-methyl o-chlorobenzamide as a white crystalline solid.

To a solution of 8.5 g. (50 mmole) of the N-methylamide in 150 ml. of tetrahydrofuran maintained at −78° C. under an atmosphere of argon were added over 0.5 hours 32 ml. of a 1.6 M solution of n-butyllithium in hexane. The mixture was maintained at −78°C. for 0.5 hours and was then added by means of a hypodermic syringe to 100 ml. of solution containing 50 ml. of tetrahydrofuran and 50 ml. of phosgene maintained at −78° C. under nitrogen. The reaction mixture was allowed to warm slowly to room temperature under nitrogen and the excess phosgene was allowed to evaporate. Dry benzene was added to the concentrated reaction mixture to dissolve the reaction product and the benzene was decanted from the insoluble lithium chloride. The benzene solution was evaporated under reduced pressure to provide a nearly quantitative yield of N-(o-chlorobenzoyl)-N-methylcarbamoyl chloride.

NMR (60 MHz, chloroform): 3.40 (s, 3H) and 7.35 (s, 4H) delta.

EXAMPLE 2

7-[α-(3-o-chlorobenzoyl-3-methyl-1-ureido)-α-phenylacetamido]-3-(1-methyl-1H-tetrazole-5-ylthiomethyl)-3-cephem-4-carboxylic acid To a suspension of 476 mg. (1mmole) of 7-(D-phenyl-glycylamido)-3-(1-methyl-1H-tetrazole-5-ylthiomethyl)-3-cephem-4-carboxylic acid in 8 ml. of acetonitrile containing 2 ml. of propylene oxide was added 1 ml. of bis-(trimethylsilyl)acetamide. When the suspension became homogeneous the mixture was cooled to 0° C. and a solution of 0.17 ml. of N-(o-chlorobenzoyl)-N-methylcarbamoyl chloride (Example 1) in 2 ml. of dry acetonitrile was added dropwise with stirring. The reaction mixture was stirred for 2 hours at 0° C. and was then allowed to warm to room temperature. The reaction mixture was poured into a mixture of ethyl acetate and water and the pH of the mixture adjusted to 2.5 with dilute hydrochloric acid. The organic phase was separated and washed with water and brine before being dried over sodium sulfate. Evaporation of the dried organic phase yielded 370 mg. of the product as a residual white foam.

A thin layer chromatogram of silica gel and developed with chloroform:methanol (7:3, v:v) showed the product to be onespot material after visualization under U.V. light or in an iodine chamber.

NMR (60 MHz, CDCl$_3$): 10.0 (d, J = 6, amide), 8.0–7.2 (aromatic, amide and acid, 12H), 6.0–5.5 (m, 2H), 4.95 (d, J = 3, 1H), 4.4 (broad, 2H), 3.9 (s, 3H), 3.6 (broad, 2H) and 3.05 (s, 3H) delta.

EXAMPLE 3

7-[2-(3-p-chlorobenzoyl-3-methyl-1-ureido)-α-phenylacetamido]-(1-methyl-1H-tetrazole-5-ylthiomethyl)3-cephem-4-carboxylic acid By following the procedures and conditions employed in the preparation described by Example 2, 460 mg. (1 mmole) of 7-(D-phenylglycylamide)-3-(1-methyl-1H-tetrazole-5-ylthiomethyl)-3-cephem-4-carboxylic acid was suspended in 8 ml. of acetonitrile containing 2 ml. of propylene oxide and solubilized with 1 ml. of bis(trimethylsilyl)acetamide. To the solution was added 232 mg. (1 mmole) of N-(p-chlorobenzoyl)-N-methylcarbamoyl chloride dissolved in 5 ml. of acetonitrile. The reaction mixture was stirred for about 2 hours in the cold and was then allowed to warm to room temperature. The product 308.6 mg., was recovered from the reaction mixture by following the extraction, acidification, and washing procedures employed in the preparation described in Example 2.

The infrared spectrum (KBr pellet) of the product showed a β-lactam carbonyl absorption peak at 1780 cm$^{-1}$.

The ultraviolet absorption spectrum of the product run in ethanol had a λ max 228, ε = 22,700.

Electrometric titration (66% DMF) of the product gave a pKa of 4.75 for the C$_4$ carboxyl group.

EXAMPLE 4

7-[α-(3-p-chlorobenzoyl-3-methyl-1-ureido)-α-(4-hydroxyphenyl)acetamido]-3-(1-methyl-1H-tetrazole-5-ylthiomethyl)-3-cephem-4-carboxylic acid By employing the acylation conditions and the solvents and reagents of Example 2, 7-(4-hydroxyphenylglycylamido)-3-(1-methyl-1H-tetrazole-5-ylthiomethyl)-3-cephem-4-carboxylic acid (630 mg., 1 mmole) was reacted with 1 mmole of N-(p-chlorobenzoyl)-N-methylcarbamoyl chloride to provide 327.3mg. of the product.

I.R. (KBr): 1770 cm$^{-1}$, β-lactam carbonyl U.V. (ethanol): ε max 234 ε = 28,000. Titration (66% DMF): pKa 5.15.

EXAMPLE 5

7-[α-(3-p-chlorobenzoyl-3-methyl-1-ureido)-60-(4-hydroxyphenyl)acetamido]-3-(5-methyl-1,3,4-thiadiazole-2-ylthiomethyl)-3-cephem-4-carboxylic acid By following the acylation and recovery procedures described for the preparation of Example 2, 1.06 g. (2 mmole) of 7-(4-hydroxyphenylglycylamido)-3-(5-methyl-1,3,4-thiadiazole-2-ylthiomethyl)-3-cephem-4-carboxylic acid was reacted with 464 mg. (2 mmole) of N-(p-chlorobenzoyl)-N-methylcarbamoyl chloride to yield 708 mg. of the product.

I.R. (KBr pellet): 1775 cm$^{-1}$, β-lactam carbonyl. U.V. (ethanol): ε max 233, ε = 26,500. Titration (66% DMF): pKa 5.1, apparent molecular weight, 684.

EXAMPLE 6

7-[α-(3-Cinnamoyl-3-methyl-1-ureido)-α-phenylacetamido]-3-methyl-1H-tetrazole-5-ylthiomethyl)-3-cephem-4-carboxylic acid By following the acylation and recovery procedures described by Example 2, 460 mg. (1 mmole) of 7-phenylglycylamido-3-(1-methyl-1H-tetrazole-5-ylthiomethyl)-3-cephem-4-carboxylic acid was silylated with BSA and reacted at −15° C. in acetonitrile with 224 mg. of N-cinnamoyl-N-methylcarbamoyl chloride to yield after recovery, 239.8 mg. of product.

I.R. (KBr pellet): 1770 cm$^{-1}$, β-lactam carbonyl. U.V. (ethanol): ε max 283, ε = 19,200 Titration (66% DMF): pKa 4.8.

EXAMPLE 7

7-[α-(3-Cinnamoyl-3-methyl-1-ureido)-α-(4-hydroxyphenyl)acetamido]-3-(1-methyl-1H-tetrazole-5-ylthiomethyl)-3-cephem-4-carboxylic acid 7-(4-Hydroxyphenylglycylamido)-3-(1-methyl-1H-tetrazole-5-ylthiomethyl)-3-cephem-4-carboxylic acid (630 mg., 1 mmole) was suspended in 8 ml. of acetonitrile containing 2 ml. of propylene oxide, and the suspension was heated with 1 ml. of bis (trimethylsilyl)acetamide to effect solution. The solution was cooled to −15° C. and a solution of 224 mg. (1 mmole) of N- cinnamoyl-N-methylcarbamoyl chloride in 5 ml. of acetonitrile was added dropwise with stirring. The product, 140 mg., was recovered by following the recovery and isolation procedures described for the recovery of the acylation product of Example 2.

I.R. (KBr pellet): 1775 cm$^{-1}$, β-lactam carbonyl. U.V. (ethanol): ε max 278, ε = 19,060. Titration (66% DMF): pKa 5.0.

EXAMPLE 8

7-[α-(3-Cinnamoyl-3-methyl-1-ureido)-α-(4-hydroxyphenyl)acetamido]-3-(5-methyl-1,3,4-thiadiazole-2-ylthiomethyl)-3-cephem-4-carboxylic acid By employing the acylation conditions, reagents and solvents empolyed in the preparation described by Example 2, 1.06 g. (2 mmole) of 7-(p-hydroxyphenyl-glycylamido)-3-cephem-4-carboxylic acid was reacted, in acetonitrile containing propylene oxide, as the trimethylsilyl derivative with 418 mg. (2 mmole) of N-cinnamoyl-N-methylcarbamoyl chloride to yield 195 mg. of product.

I.R. (KBr pellet): 1775 cm$^{-1}$, β-lactam carbonyl. U.V. (ethanol): λ max 281, ε = 28,150 Titration (66% DMF): pKa 5.1, apparent molecular weight 677.

EXAMPLE 9

7-[α-(3-Acetyl-3-methyl-1-ureido)-α-phenylacetamido]-3-(1-methyl-1H-tetrazole-5-ylthiomethyl)-3-cephem-4-carboxylic acid 7-(D-Phenylglycylamido)-3-(1-methyl-1H-tetrazole-5-ylthiomethyl)-3-cephem-4-carboxylic acid was reacted with an equimolar amount of N-acetyl-N-methylcarbamoyl chloride by following the acylation conditions and by using the solvents and techniques employed in the preparation described by Example 2 to yield the product named above.

I.R. (Chloroform): 1770 cm$^{-1}$, β-lactam carbonyl. NMR (CDCl$_3$): signals at 7.2–7.6 (5H, aromatic), 5.4–5.9 (m, 2H), 4.88 (d, 1H), 4.2–4.4 (m, 2H), 3.85 (s, 3H, tetrazole 1-methyl), 3.5–3.8 (m, 2H), 3.17 (s, 3H, N-methyl), and 2.27 (s, 3H, N-acetyl) delta.

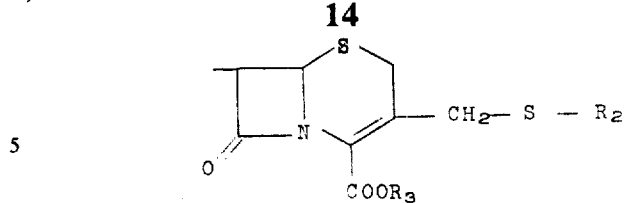

We claim:

1. The compound of the formula

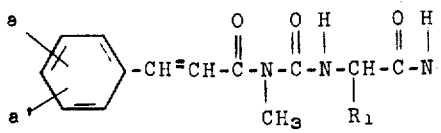

wherein $a$ and $a'$ are independently hydrogen, halogen or nitro;

$R_1$ is phenyl, monohydroxyphenyl, mono- or dihalophenyl, monohydroxy substituted mono- or dihalophenyl, thienyl or furyl;

$R_2$ is

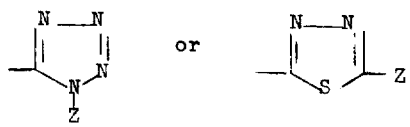

wherein $Z$ is $C_1$–$C_4$ lower alkyl;

$R_3$ is hydrogen, indanyl, phthalidyl or an acyloxymethyl group of the formula

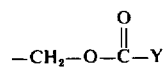

wherein

Y is $C_1$–$C_4$ alkyl or phenyl; and when $R_3$ is hydrogen, the pharmaceutically acceptable, nontoxic salts thereof.

2. The compound of claim 1 wherein $R_1$ is phenyl, monohydroxyphenyl, monohydroxy substituted mono- or dihalophenyl or thienyl; $R_3$ is hydrogen or the pharmaceutically acceptable, non-toxic salts thereof.

3. The compound of claim 1, said compound being 7-[α-(3-cinnamoyl-3-methyl-1-ureido)-2-phenylacetamido]-3-(1-methyl-1H-tetrazole-5-ylthiomethyl)-3-cephem-4-carboxylic acid.

4. The compound of claim 1, said compound being 7-[α-(3-cinnamoyl-3-methyl-1-ureido)-α-(4-hydroxyphenyl)acetamido]-3-(1-methyl-1H-tetrazole-5-ylthiomethyl)-3-cephem-4-carboxylic acid.

5. The compound of claim 1, said compound being 7-[α-(3-cinnamoyl-3-methyl-1-ureido)-α-(4-hydroxyphenyl)acetamido]-3-(5-methyl-1,3,4-thiadiazole-2-ylthiomethyl)-3-cephem-4-carboxylic acid.